Patented May 8, 1945

2,375,738

UNITED STATES PATENT OFFICE 2,375,738

PREPARATION OF SOLS

John F. White, Medford, Mass., assignor to Monsanto Chemical Company, St. Louis, Mo., a corporation of Delaware No Drawing. Application May 3, 1943,
Serial No. 485,493

14 Claims. (Cl. 252—309)

This invention relates to the preparation of sols, and particularly to the preparation of stable aquasols of high concentration. The invention also relates to the preparation of organosols and organo-aquasols from the aquasols of the type described.

It is a primary object of the invention to prepare sols which are exceedingly stable and of high concentration.

A further object of the invention is to prepare stable aquasols which may be readily converted into equally stable sols of other types, such as organosols and organo-aquasols.

Still further objects and advantages of the invention will appear from the following description and appended claims. Before explaining in detail the present invention, however, it is to be understood that the invention is not limited in its application to the details described herein, since the invention is capable of other embodiments and of being practiced or carried out in various ways.

The invention is carried out in general by first preparing an aquagel by reacting an acid with a water-soluble silicate, washing the resulting gel with water to remove the electrolytes formed during the reaction, covering the gel with a weak aqueous solution of a substance capable of forming hydroxyl ions and, after removing the gel from the solution, heating the gel, while avoiding evaporation of water, until substantially all of the gel is converted to a sol.

It is usually desirable to allow the initially formed gel to cynerize for several hours, after which the syneresis liquor is removed, and then to crush the gel into lumps, preferably about one inch in cross section, before subjecting it to the washing and subsequent treatment. The washing may be carried out in any desired manner, but is preferably accomplished by subjecting the gel to a continuous flow of water for a period of time varying from 5 to 20 hours.

The initial gel may be prepared with any desired concentration of silica between about 1 and 15% and with a pH varying between 1.5 and 7. Sulfuric acid, or other mineral acid, is the preferred acid for preparing the gel, but other acids capable of forming salts by reaction with silicates, such as acetic or tartaric acids, can be used. Although various silicates may be employed as the source of silica, sodium or potassium silicate is preferred.

In general, exceedingly weak solutions of the substance containing or forming hydroxyl ions are employed. Using caustic soda as an example, it is possible to employ concentrations in aqueous solution varying between 0.03 and 0.50% NaOH. If larger or smaller amounts are employed the desired high degree of peptization will not take place. Slightly stronger solutions of other hydroxyl containing or hydroxyl forming substances may be required however in some instances.

In heating the gel subsequent to treatment with solutions containing hydroxyl ions, it is essential to avoid any substantial evaporation of water. This is most suitably accomplished by heating in an autoclave or other closed vessel, preferably at temperatures varying from about 80 to 200° C. or higher, and at absolute pressures varying from about 7 to 225 pounds per square inch or higher.

Although caustic soda is preferred as the source of hydroxyl ions, in view of the exceedingly small amounts required for effective results, it is possible to use a variety of other materials capable of furnishing hydroxyl ions. For example, under suitably controlled conditions, it is possible to use as substitutes for caustic soda such materials as caustic potash, sodium or potassium carbonate, trisodium phosphate, tripotassium phosphate, and hydroxides of the alkaline earth metals, such as calcium or barium hydroxide.

The sols prepared in the above described manner usually have a pH varying between 7 and 10. If, however, it is desired to use the sols in a system in which free alkali is detrimental, the pH of the sols may be adjusted by the addition of acid to values as low as 2 pH without affecting the stability of the sol.

A more complete understanding of the invention will be obtained from the following examples:

*Example I*

Sixty-eight and one-half pounds of 66° Bé. $H_2SO_4$ are diluted with 358 pounds of water and charged to a mixing tank. Four hundred and seventy-two pounds of a sodium silicate solution analyzing 8.9% $Na_2O$ and 29% $SiO_2$ are diluted with three hundred and seventy-seven pounds of water and added with stirring to the acid solution. The mixture sets to a gel a few minutes after the mixture is completed. After 16 hours aging the syneresis liquor is siphoned off and the gel crushed to one inch lumps. These lumps are washed with a continuous flow of water for 16 hours. The washed gel is then covered with seven hundred and fifty pounds of water containing 0.9 pound of NaOH. After standing 6 hours the excess solution is drained off and the gel is charged to an autoclave. The gel is heated for three hours, using steam at two hundred and fifteen pounds per square inch absolute pressure in the jacket of the autoclave. The contents of the autoclave are then blown out and the small amount of residual undispersed gel is removed by filtration. The sol so produced will have the following average analysis:

| | Per cent |
|---|---|
| pH | 9.2 |
| $SiO_2$ | 12.5 |
| $Na_2SO_4$ | 0.05 |
| NaOH | 0.075 |

Example II

An aquagel prepared as described in Example I is aged for about 12 hours, after which the syneresis liquor is siphoned off and the gel is crushed to one inch lumps. These lumps are washed with a continuous flow of water for about 12 hours. The washed gel is then covered with seven hundred and fifty pounds of water containing 2.25 pounds of $Na_3PO_4$. After standing for about 6 hours the excess solution is drained off, and the gel is charged to an autoclave. The gel is heated for about 3 hours, using steam at 180 pounds per square inch absolute pressure in the jacket of the autoclave. The contents of the autoclave are then blown out and the small amount of residual undispersed gel is removed by settling. The resulting sol has an $SiO_2$ content of about 12.5% and a pH of 8.4.

Example III

An aquagel prepared as described in Example I is aged for about 4 hours, after which the syneresis liquor is siphoned off and the gel is crushed to one inch lumps. These lumps are washed with a continuous flow of water for about 20 hours. The washed gel is then covered with seven hundred and fifty pounds of water containing 4.5 pounds of $Na_2CO_3$. After standing for about 10 hours the excess solution is drained off, and the gel is charged to an autoclave. The gel is heated for about 6 hours at seventy-five pounds per square inch absolute pressure in the jacket of the autoclave. The contents of the autoclave are then blown out and the residual undispersed gel is removed by filtration. The resulting sol has an $SiO_2$ content of about 12.5% and a pH of 9.4.

The aquasols prepared as hereinbefore described may be readily converted into a wide variety of sols containing more or less organic solvent. For example, an organo-aquasol containing both water and an organic solvent may be obtained by merely adding any desired amount of a water-miscible organic solvent, such as acetone, methyl, ethyl and propyl alcohol. It is necessary however, in order to obtain a stable sol, first to adjust the pH of the aquasol to a pH between 0.5 and 8.5 by the addition of acid.

It is also possible to obtain an organo-aquasol of the type described above by replacing a portion of the water in the aquasol, as for example, by adding to the aquasol a water-miscible organic solvent having a boiling point higher than that of water and removing a portion of the water by distillation. Moreover, if it is desired to obtain a substantially anhydrous organosol, this may be accomplished in the same way, but with the removal of substantially all of the water. When the sol is subjected to boiling or distillation, as in the above instances, the initial aquasol must be adjusted to a pH not higher than 7.5, that is, a stable sol can only be obtained from aquasols having a pH between 0.5 and 7.5.

Suitable solvents which may be used to replace part or all of the water in the aquasol include ethyl "cellosolve," methyl "cellosolve" acetate, methyl "carbitol" and ethyl "carbitol."

It is also possible to replace part or all of the water in the aquasols prepared as described above with a water-miscible organic solvent having a boiling point lower than that of water. For example, ethyl alcohol may be added to the aquasol, after which benzene may be added in an amount sufficient to permit removal of part or all of the water in the form of a ternary constant boiling mixture containing water, alcohol and benzene. The resulting sol contains at least a major proportion of ethyl alcohol, and can be made substantially free of water. In this instance also, it is necessary to adjust the pH of the aquasol to not higher than 7.5 prior to adding the organic solvents.

It is to be understood that other water-miscible organic solvents capable of forming a ternary constant boiling mixture with each other and with water may be used instead of ethyl alcohol and benzene.

If a substantially anhydrous organosol composed of silica and a water-immiscible organic solvent is desired, this can be obtained by replacing the water-miscible organic solvent in the anhydrous organosols prepared by any of the above described methods with a water-immiscible organic solvent having a boiling point higher than the water-miscible organic solvent being replaced. For example, octyl alcohol, which is water-immiscible and has a higher boiling point than ethyl cellosolve, may be added to an ethyl cellosolve sol, after which the ethyl "cellosolve" may be removed by distillation. As a further example, ethyl silicate may be added to an anhydrous ethyl alcohol sol, after which the ethyl alcohol is removed by distillation.

The various sols described herein have a wide utility in industry. For example, they may be used as film formers, either alone or in combination with other coating materials. Moreover, they may be used as binders for refractory materials, such as those contained in refractory molds or in roofing.

Where reference is made herein and in the appended claims to organosols, it is to be understood that the sols are substantially free of water, while the term "organo-aquasols" is intended to include sols containing any desired proportion of both an organic solvent and water.

I claim:

1. A process of making an aquasol containing colloidal silica and water which comprises first preparing a silica aquagel by reacting an acid with a water soluble silicate, washing the aquagel to remove the electrolytes formed, covering the gel with a solution of a substance capable of forming hydroxyl ions, separating the gel from the major portion of said solution and heating the treated gel without evaporation of water until substantially all of the gel is converted to a sol.

2. A process of making an aquasol containing colloidal silica and water which comprises first preparing a silica aquagel by reacting an acid with a water soluble silicate, allowing the gel to synerize, crushing the gel into lumps, washing the gel with water to remove the electrolytes formed, covering the gel with a solution of a substance capable of forming hydroxyl ions, separating the gel from the major portion of said solution and heating the treated gel without evaporation of water until substantially all of the gel is converted to a sol.

3. A process of making an aquasol containing colloidal silica and water which comprises first preparing a silica aquagel by reacting an acid with a water soluble silicate, allowing the gel to synerize for several hours, crushing the gel into lumps, washing the aquagel to remove the electrolytes formed, covering the gel with a weak solution of a substance capable of forming hydroxyl ions, removing the gel from said solution, and heating the treated gel in an autoclave at a temperature of at least 80° C. until substantially all of the gel is converted to a sol.

4. A process of making an aquasol containing colloidal silica and water which comprises first preparing a silica aquagel by reacting sulfuric acid with a water soluble silicate, washing the aquagel to remove the sulfate formed, covering the gel with a weak aqueous solution of a substance capable of forming hydroxyl ions, separating the gel from the major portion of said solution and heating the treated gel without the evaporation of water until substantially all of the gel is converted to a sol.

5. The process as described in claim 4 but further characterized in that the substance capable of forming hydroxyl ions is an alkali hydroxide.

6. The process as described in claim 4 but further characterized in that the substance capable of forming hydroxyl ions is an alkali carbonate.

7. The process as described in claim 4 but further characterized in that the substance capable of forming hydroxyl ions is an alkaline earth hydroxide.

8. A process of making an aquasol containing colloidal silica and water which comprises first preparing a silica aquagel by reacting dilute sulfuric acid with an aqueous sodium silicate solution, allowing the resulting gel to synerize, crushing the gel into lumps, washing the gel to remove the sodium sulfate formed, covering the gel with a dilute aqueous solution of caustic soda containing from 0.03 to 0.50% of NaOH, separating the gel from the major portion of said solution and heating the gel for at least 2 hours in an autoclave at a temperature of at least 80° C.

9. A process of making an organo-aquasol containing colloidal silica, organic solvent and water which comprises preparing an aquasol as described in claim 1, adjusting the pH of said aquasol to a pH between 0.5 and 8.5, and adding a water-miscible organic solvent thereto.

10. A process of making an organo-aquasol containing colloidal silica, organic solvent and water which comprises preparing an aquasol as described in claim 1, adjusting the pH of said aquasol to a pH between 0.5 and 7.5, adding thereto a water-miscible organic solvent having a boiling point higher than that of water, and boiling the resultant mixture until a portion of the water is removed.

11. A process of making an organosol containing colloidal silica and an organic solvent which comprises preparing an aquasol as described in claim 1, adjusting the pH of said aquasol to a pH between 0.5 and 7.5, adding thereto a water-miscible organic solvent having a boiling point higher than that of water, and boiling the resulting mixture until substantially all of the water is removed.

12. A process of making an organosol containing colloidal silica and an organic solvent which comprises preparing an aquasol as described in claim 1, adjusting the pH of said aquasol to a pH between 0.5 and 7.5, adding thereto a water-miscible organic solvent having a boiling point lower than that of water, adding organic solvent of the type which forms a ternary constant boiling mixture with water and said water-miscible organic solvent in an amount sufficient to permit substantially complete removal of the water by distillation, and then removing the water by distillation.

13. A process of making an organosol containing colloidal silica and a water-immiscible organic solvent which comprises preparing an aquasol as described in claim 1, adjusting the pH of said aquasol to a pH between 0.5 and 7.5, adding thereto a water-miscible organic solvent having a boiling point higher than that of water, boiling the resulting mixture until substantially all of the water is removed, adding a water-immiscible organic solvent having a boiling point higher than that of the water-miscible organic solvent and removing the water-miscible organic solvent by distillation.

14. A process of making an organosol containing colloidal silica and a water-immiscible organic solvent which comprises preparing an aquasol as described in claim 1, adjusting the pH of said aquasol to a pH between 0.5 and 7.5, adding thereto a water-miscible organic solvent having a boiling point lower than that of water, adding an organic solvent of the type which forms a ternary constant boiling mixture with water and the water-miscible organic solvent in an amount sufficient to permit substantially complete removal of the water by distillation, removing the water by distillation, then adding a water-immiscible organic solvent having a boiling point higher than that of the water-miscible organic solvent, and removing the water-miscible organic solvent by distillation.

JOHN F. WHITE.